Oct. 29, 1935.        A. F. VICTOR        2,019,280
SOUND RECORDING
Filed Sept. 14, 1934
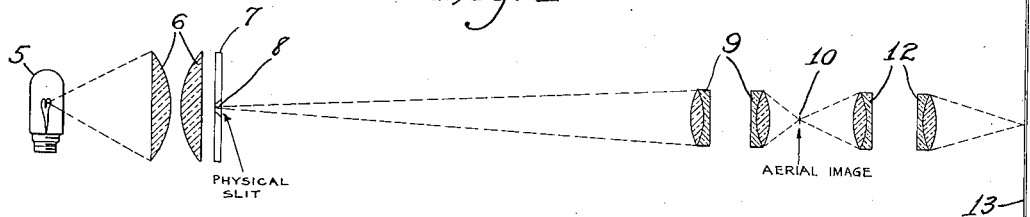
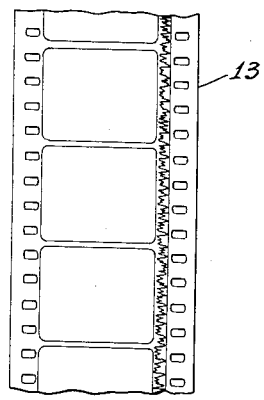
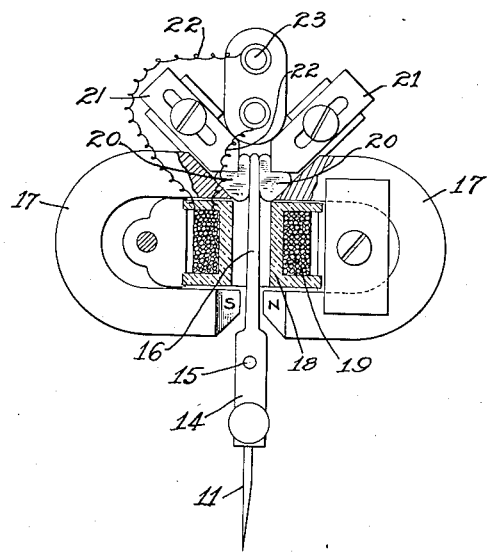
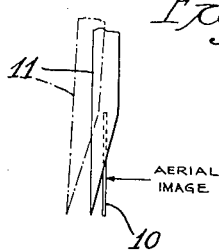
Inventor:
ALEXANDER FERDINAND VICTOR
By E. R. Lundy
Atty.

Patented Oct. 29, 1935

2,019,280

UNITED STATES PATENT OFFICE 2,019,280

SOUND RECORDING

Alexander Ferdinand Victor, New York, N. Y.

Application September 14, 1934, Serial No. 743,992

3 Claims. (Cl. 179—100.3)

My present invention relates broadly to the recording of sound, and it is more particularly directed to a method of and apparatus for producing a photographic sound record to be used in connection with and upon a cinematographic film or other carrier.

In sound recording, especially for coordination or synchronization with motion pictures, two general systems are practiced, the so-called "variable density" and the "variable area". Variable density is attained by means of a glow-lamp, the intensity of which is governed by an electrical impulse from the acoustic waves, and which in turn imprints striations on the moving film in varying degrees or tones of greys. The variable area is made up of blacks and whites, the relative proportions of the blacks and whites representing in their mixtures the same thing as the varying greys in the variable density.

My system may be classed in the variable area system and constitutes the formation of a series of striations across the sound track of the film, each striation having opaque and transparent portions, so that the varying quantities of light rays passing through said striations are capable of forming sound when reproduced and translated into electrical impulses for amplification.

It has heretofore been proposed to direct light through a physical slit toward a photo-sensitive film and to provide a normally closed shutter operating longitudinally of the slit which shutter is oscillated by electrodynamic means according to the volume, pitch, etc., of the sound to be recorded. One of the objections to the above-described system is that considerable movement of the oscillator is required in covering the slit. Furthermore, it is practically impossible, when dealing with so small a slit as is required, to place the oscillator blade close enough to the slit so that both the blade and the slit are properly focused on the film;—one or the other is always out of focus. It will be understood that a very sharp, well-defined edge is necessary to secure good quality of sound.

To overcome the inherent objections I have devised a method and apparatus that employs the phenomenon of the "aerial image" whereby an image of an object is, by a means of a lens or lens system, formed in the air at the point where a visual image would be observed on a plane surface interposed at that point. Since the aerial image has no thickness I am able to place the oscillator blade at the exact location where the aerial image of a slit may be formed.

Also by employing a tapered or slanting oscillator blade I am able to cut in across the aerial image with a very small amount of movement as compared to the movement required to move the blade longitudinally of the physical slit as above described. Another feature of my invention resides in the fact that the aerial image of the slit may be focused to almost microscopic dimensions that would be physically impossible to produce in a physical object, thereby materially reducing the extent of movement that is usually required of the oscillator blade acting in the prior devices.

The primary object of my invention is to provide an improved method and apparatus for photographically recording sound waves upon a sound track of a motion picture film or other suitable media. Also it is an object to photographically produce a sound record in an extremely accurate manner so that such recording will readily respond to the frequencies of the audible sound waves thus producing a true record in all respects. Other objects are to provide a method and apparatus that effectively performs its functions and is novel in construction. These and other objects I prefer to accomplish in the manner hereinafter fully described and as more particularly pointed out in the claims. For convenience in understanding my improved method and apparatus, reference is made to the accompanying drawing that forms a part of this specification.

In the drawing:—

Figure 1 is a schematic lay-out of one form of apparatus for effectively practicing my invention.

Figure 2 is a schematic view of a short length of cinematographic film or other media showing the sound record as it may photographically appear thereon.

Figure 3 shows the details of a type of magnetic sound pick-up that is adapted to vibrate the oscillator blade.

Figure 4 is an exaggerated view illustrating the principle of operation of the oscillator with respect to the aerial image.

The lamp or other light source, designated as 5 may be the usual type of single coil filament such as used for the reproduction of sound in motion picture projectors. Axially alined with the light point of the lamp are the condensing lenses 6 which are interposed between the lamp 5 and an opaque element 7 in which there is an elongated preferably horizontally disposed slit 8 that is very narrow in width and is generally known as the "physical slit". The light rays from the lamp are concentrated at and pass through the slit 8 to the reducing lenses 9 which focus and form an aerial image of the slit at a convenient place in the atmosphere which is designated as 10 in Figure 1 of the drawing.

This aerial image 10 is a very small reproduction of the slit approximating one-tenth or more the dimensions of the original physical slit 8.

An oscillator or spear-shaped blade 11 is positioned at the exact location of the aerial image so that it may be vibrated in the same transaxial plane in which the image appears. Beyond the oscillator there is a set of lenses 12 which receive the aerial image of the slit when it is exposed by the vibration of the oscillator and enlarge said image several times bringing it up to the standard dimensions required to use it upon the sensitive media or film 13.

The formation of an aerial image of the physical slit provides a means for reducing the dimensions of the slit to a degree where the oscillator may create a comparatively large movement, and it also permits the oscillator to perform its functions precisely in the focal plane of the aerial image without interference from any physical impedance such as will arise where an image is formed on a media such as glass, celluloid, etc.

The oscillator blade has oblique edges so that they obliquely pass through the aerial image of the slit and said blade may be actuated magnetically or dynamically. For convenience I have shown the former type.

The blade 11 is carried in the outer end of a vibratory bar 14 fulcrumed adjacent its outer end on its pivot 15 while its inner portion provides a vibratory armature 16. This armature portion of the bar extends between the pole faces of complementary permanent magnets 17 of horseshoe shape, and between the arms of these magnets there is a hollow spool 18 of insulation upon which electrical conductor 19 is wound. The armature portion of the bar extends through the center of the spool with its free end between the pole faces of the magnets, its vibratory movement being limited by elastic pads 20 that are maintained in grooves in the magnet arms and clamped in position by adjustable wedge plates 21.

The ends of the coil are electrically connected by conductors 22 to terminal sockets 23 from which electrical connection may be made with suitable electrical elements which convert sound waves to the control into electric frequencies corresponding with the sounds.

In lieu of electrically vibrating the bar carrying the blade, said blade may be operated by the vibrations of audio-sensitive elements and as are actuated by a phonograph needle in picking up the undulations in the sound track of a talking-machine record. Either this method or that first described above is well adapted for my purposes.

What I claim is:—

1. A device of the kind described comprising a plate having an elongated slit, means for condensing light rays through said slit, a lens system in the path of light rays emitted through the slit adapted to form a miniature aerial image of said slit, an opaque vibratory member in the exact plane of the miniature aerial image, and a second lens system adapted to project the aerial image upon a photo-sensitive media.

2. A device of the kind described comprising a plate having an elongated slit, means for condensing light rays through said slit, a lens system in the path of light rays emitted through the slit adapted to form a miniature aerial image of said slit, an electro-responsive oscillator blade interrupting the light rays at the focus of the aerial image, and a second lens system adapted to project the aerial image upon a photo-sensitive media.

3. A device of the kind described comprising a plate having an elongated slit, a source of light on one side of said plate, means for condensing light rays from said source through said slit, a photo-sensitive media spaced from said plate upon the side thereof opposite said light source and adapted to receive an image of said slit, two lens systems interposed between said plate and said media, the lens system nearest said plate adapted to form an aerial image of the slit between the lens systems and the other lens system adapted to project the aerial image upon said media, and an opaque member vibratory across the axis of the lens systems in the exact plane of the aerial image.

ALEXANDER FERDINAND VICTOR.